April 5, 1966 J. H. NORWOOD 3,243,842
METHOD OF KILLING POULTRY
Original Filed July 1, 1963

INVENTOR.
JAMES HASKELL NORWOOD
BY Lawton, Hopkins,
Jones & Ormsby
ATTORNEYS

United States Patent Office 3,243,842
Patented Apr. 5, 1966

3,243,842
METHOD OF KILLING POULTRY
James Haskell Norwood, Gainesville, Ga., assignor to Gainesville Machine Company, Inc., Gainesville, Ga., a corporation of Georgia
Original application July 1, 1963, Ser. No. 291,791. Divided and this application Mar. 12, 1965, Ser. No. 439,197
4 Claims. (Cl. 17—45)

This application is a divisional application of my copending application, Serial No. 291,791, filed July 1, 1963, for "Poultry Killing Device," now abandoned.

This invention relates to meat processing methods and more particularly to a poultry processing method for killing poultry as it passes along a poultry processing line.

In the processing of poultry and other fowl, the bird is usually suspended head down from a shackle which travels along an overhead conveyor to those locations at which various processing operations are performed. Most of these processing operations are performed automatically by various poultry processing devices. However, the killing of the bird is often accomplished by hand because no previous device for accomplishing this processing operation automatically has been completely satisfactory. This is because the bird is preferably killed by severing its jugular vein so that its body is drained of blood as it bleeds to death and because it is undesirable to also sever either the spinal cord or windpipe of the bird at the time the jugular vein is severed.

Severing the jugular vein of the bird and permitting the blood to drain from its body improves the quality of the meat. However, if the spinal cord of the bird is also severed, muscular spasms will occur. These muscular spasms are undesirable because, until they cease, they make it difficult, if not impossible, to process the bird further. The muscular spasms which result from the severing of the spinal cord are also undesirable because they cause blood draining from the jugular vein of a bird to be thrown over a wide area rather than to be confined to the area of the processing line. In addition, the severing of the spinal cord is undesirable because it stops the heartbeat of the bird. The continuing heartbeat obtained for a period of time when only the jugular vein of the bird is severed is highly desirable because it causes blood to be pumped from the bird's body rather than simply to flow from the body by gravity.

If the windpipe is severed at the time the jugular vein is severed, the continuing heartbeat of the bird which produces the highly desirable pumping of blood from the body of the bird will also cause continued breathing of the bird and the undesirable drawing of blood into the lungs of the bird. This is undesirable because the proper processing of meat such as poultry requires that as much blood as possible be removed from the body of the bird.

Thus, it is preferable that the killing of poultry as it moves along a processing line in stunned condition be accomplished by severing the jugular vein and without also severing either the spinal cord or the windpipe. No previous meat processing device has accomplished this processing operation in a completely satisfactory manner. However, the invention disclosed herein kills a bird in a completely satisfactory and fully automatic manner as the bird passes along the usual processing line.

The invention is a poultry processing method employing a device having one or more substantially identical processing units. Each processing unit comprises a knife which penetrates the neck of a bird to that limited extent necessary to sever only the jugular vein of the bird and an orienting means which positions the bird with respect to the knife as the bird passes along a poultry processing line. The orienting means has two guide surfaces which form a channel with an entry throat at one end. The knife is positioned at that end of the channel most remote from the throat. Motion is imparted to the processing unit, to the bird, or to both so that the neck of the bird passes into the throat and through the channel of the orienting means. The orienting means engages the neck and head of the bird and positions the bird so that the side of the bird's neck is in position to be properly engaged by the knife. The knife is adjusted to engage the side of the bird's neck as the neck passes through the channel and to penetrate the neck only to that depth necessary to sever only the jugular vein.

These and other features and advantages of the invention will be more clearly understood from the following detailed description and the accompanying drawings in which like characters of reference designate corresponding parts in all figures and in which.

Figure 1:
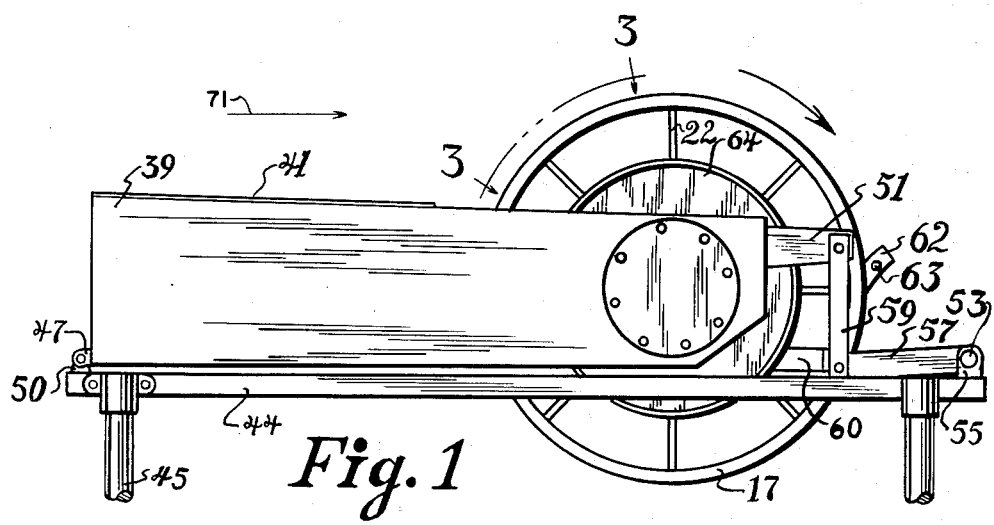
FIG. 1 is a side elevational view of the poultry processing device.

These drawings and the following detailed description disclose a preferred specific embodiment of the invention but the invention is not limited to the details disclosed since it may be embodied in other equivalent forms.

This invention is best understood as comprising one or more processing units with each processing unit having a knife 10 and an orienting means with two guide surfaces 11 and 12 between which the neck of a bird passes. The guide surfaces 11 and 12 orient the neck of the bird as it passes between them and the knife 10 extends into the space between the guide surfaces 11 and 12 and penetrates the neck of the bird so as to sever only the jugular vein on either side of the bird's neck. The left guide surface 11 and the right guide surface 12 form a narrow channel 15 and a wider throat 16 between themselves.

When the processing unit and the neck of a bird are moved relative to each other so that the neck of the bird enters the throat 16 and then passes through the channel 15, the wider throat 16 serves to guide the neck of the bird into the narrow channel 15. As the guide surfaces 11 and 12 pass along the neck of the bird, the guide surfaces 11 and 12 are moved downward relative to the body of the bird suspended head down. As a result, the guide surfaces 11 and 12 not only guide the neck of the bird through the narrow channel 15 but also engage the head of the bird and force it downward away from the body of the bird. Since the head of a bird such as a chicken is somewhat egg-shaped, this downward motion of the guide surfaces 11 and 12 not only stretches the bird's neck but also causes the head of the bird to orient itself with the long axis of the head parallel to or coinciding with the bird's line of motion between the left guide surface 11 and the right guide surface 12. The position of the head fixes the position of the bird's neck. Thus, as the neck of a bird passes through the channel 15 between the left guide surface 11 and the right guide surface 12, the bird is positioned so that one side of the neck is adjacent to the left guide surface 11 and the other side is adjacent to the right guide surface 12.

The knife 10 extends into the channel 15 between the left guide surface 11 and the right guide surface 12. Since the head of the inverted bird is just below the channel 15 because of the downward pressure of the left guide 11 and of the right guide surface 12 on the head of the bird as the guide surfaces 11 and 12 extend and position the bird's neck, this positioning of the knife 10 causes the knife to engage a side of the bird's neck just above the head in that area where one of the two jugular veins of the bird is relatively exposed. There is a jugular vein on each side of the bird's neck and it is immaterial which side of the bird's neck passes along the left guide bar 11 or the right guide bar 12. Thus, it is immaterial whether the bird passes frontward or backward through the channel 15.

The knife 10 extends into the channel 15 between the left guide surface 11 and the right guide surface 12 only to that extent necessary for the knife 10 to sever only the jugular vein without at the same time severing either the spinal cord or the windpipe of the bird. Various arrangements may be used to position the knife 10 and adjust the extent to which the knife 10 extends into the channel 15. Moreover, various arrangements may also be used to provide the guide surfaces 11 and 12 and to move the guide surfaces 11 and 12 relative to the neck of a bird so that the neck of the bird is guided by the throat 16 into the channel 15 where it is stretched and oriented with its sides between the guide surfaces 11 and 12 so as to be properly engaged by a knife 10 extending into the channel 15.

Figure 2:
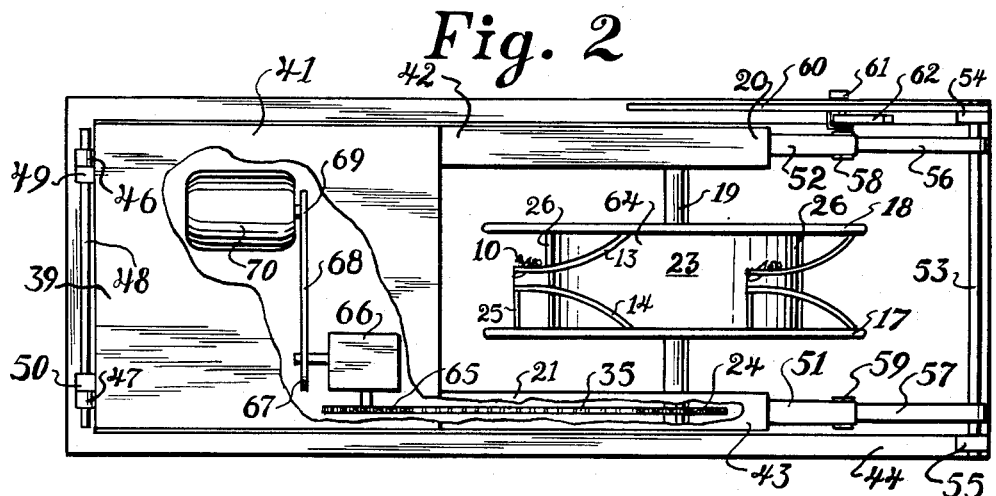
FIG. 2 is a top plan view of the poultry processing device with a portion of the covers for the housing and for the right arm cut away to show the drive mechanism.
Figure 3:
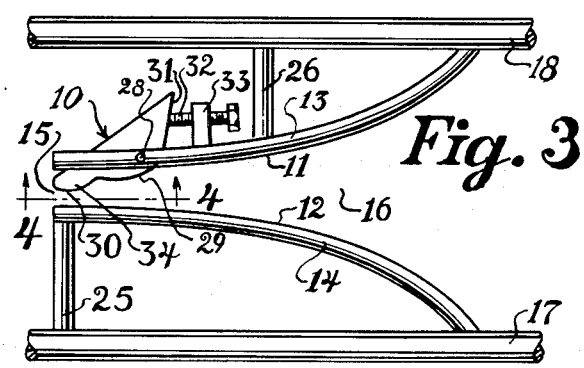
FIG. 3 is an enlarged detailed view of one of the plurality of processing units carried between the rotating rings of the poultry processing device shown in FIG. 1 and as viewed along the line 3—3 in FIG. 1, but flattened for clarity of illustration.
Figure 4:
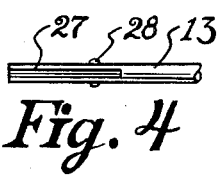
FIG. 4 is a sectional view taken in line 4—4 in FIG. 3 so as to show the slot in the left guide bar from which the knife extends.

However, it has been found that the poultry processing device shown in FIGS. 1 and 2 provides a convenient and fully automatic means for imparting motion to a plurality of processing units relative to the necks of birds moving along a poultry processing line and for properly positioning the knife. This embodiment of the invention has a plurality of processing units positioned between a right circular ring 17 and a left circular ring 18. The right circular ring 17 and the left circular ring 18 are positioned parallel to each other on a rotatable axle 19 extending between and into a left arm 20 and a right arm 21. The rings 17 and 18 are mounted on the rotatable axle 19 by extending a plurality of spokes 22 radially from the surface of a cylinder 23 fixedly mounted on the axle 19. FIG. 1 shows only the plurality of spokes 22 supporting the right ring 17, but it is to be understood that a similar plurality of spokes 22 extend from the cylinder 23 to support the left ring 18.

The end of the axle 19 within the right arm 21 has a gear wheel 24 fixedly positioned on it and rotatable within the right arm 21. Rotation of the gear wheel 24 rotates the axle 19 and the rings 17 and 18. In the specific embodiment of the invention described herein the rings 17 and 18 are rotated in a clockwise direction as viewed in FIG. 1 and as indicated by the arrow in FIG. 1. The left guide surface 11 of each processing unit is provided by a left guide bar 13 and the right guide surface 12 is provided by a right guide bar 14. The left guide bar 13 of each the plurality of processing units is fixedly attached at one end to the left ring 18 and extends from the left ring 18 in curving manner toward the right ring 17 and then in a direction parallel to the left ring 18 and opposite to the rotational direction of the rings 17 and 18. Similarly, the ring guide bar 14 is attached at one end to the right ring 17 and extends from the right ring 17 in curving manner toward the left ring 18 and then in a direction parallel to the right ring 17 and opposite to the rotational direction of the rings 17 and 18. Together, the left guide bar 13 and the right guide bar 14 of each of the plurality of processing units form the throat 16 and channel 15 of an orienting means.

The extending end of the right guide bar 14 is fixedly positioned by a strut 25 between the right ring 17 and the extending end of the right guide bar 14. The extending end of the left guide bar is fixedly positioned by a strut 26 between the mid-length of the left guide bar 13 and the left ring 18. The strut 26 supporting the left guide bar 13 and the strut 25 supporting the right guide bar 14 are in different relative positions in order to provide an unobstructed area between the left guide bar 13 and the left ring 18 for positioning the knife 10.

The knife 10 is essentially triangular in shape and is placed in a slot 27 through the left guide bar 13 by pivoting it at one corner about a pin 28 extending perpendicular to the plane of the knife 10 and through the left guide bar 13 and the knife 10. The second corner of the knife 10 is between the left guide bar 13 and the left ring 18 and the third corner of the knife 10 is in the channel 15 between the left guide bar 13 and the right guide bar 14.

The side of the knife 10 between the first corner and the third corner is the blade 34 of the knife 10 and the blade 34 extends into the channel 15 between the left guide bar 13 and right guide bar 14 to an extent determined by the pivotal position of the knife 10 about the pin 28. The blade 34 comprises a positioning portion 29 and a cutting portion 30. The positioning portion 29 has a dull edge and curves from the first corner, through the slot 27, and into the channel 15 where it becomes substantially parallel to the left guide bar 13. The cutting portion 30 is continuous with the positioning portion 29 between the positioning portion 29 and the third corner and is sufficiently sharp to penetrate the neck of a bird. Regardless of the pivotal position of the knife 10, the cutting portion 30 of the blade 34 extends into the channel 15 between the left guide bar 13 and the right guide bar 14 to a greater extent than the positioning portion 29. The difference between the extent which the cutting portion 30 and the positioning portion 29 of the blade 34 extend into the channel 15 is selected to correspond to the depth which the neck of a bird must be penetrated in order to sever only its jugular vein. Thus, when the knife 10 is positioned so that the neck of a bird will just pass between the positioning portion 29 of the blade 34 and the right guide bar 14, the cutting portion 30 will penetrate the neck of the bird to exactly that degree necessary to sever only the jugular vein of the bird.

The knife 10 is pivotally positioned so that the neck of a bird will just pass between the positioning portion 29 of the blade 34 and the right guide bar 14, by engaging the side 31 of the knife 10 between the first corner and second corner with the end of a bolt 32 threadably inserted through a bracket 33 fixedly attached to the left guide bar 13 between the left guide bar 13 and the left ring 18. As the neck of the bird passes between the left guide bar 13 and the right guide bar 14 it will first engage the positioning portion 29 of the blade 34 and because the positioning portion 29 of the blade 34 is relatively dull, the pressure of the neck of the bird on the positioning portion 29 of the blade will tend to rotate the knife 10 about the pin 28 and into the slot 27 in the left guide bar 13. The knife 10 will rotate under the pressure exerted by the neck of the bird until the knife 10 engages the end of the bolt 32. Thus, the amount of pivotal motion which the knife 10 will experience as the result of the pressure exerted by the neck of a bird before the knife 10 engages the bolt 32, and the pivotal position of the knife 10 when the neck of a bird passes between the blade 34 and the right guide bar 14, is adjusted by simply adjusting the position of the end of the bolt. The position of the end of the bolt 32 is adjusted by rotating the bolt 32 in the bracket 33.

Preferably, the knife is freely pivotable in the slot. This insures that the knife position is fixed by the end of the bolt 32 and not by possible binding in the slot 27.

Birds to be killed by the poultry killing device described herein approach the rings 17 and 18 in a stunned condition carried by a conveyor belt or other known means for transporting poultry head down along a processing line. Preferably, the bird is brought into the area of the rings 17 and 18 in the direction indicated by the arrow 71 in FIG. 1 with its neck extending through a horizontal plane tangent to the rings 17 and 18 at their uppermost points. The bird is carried between the rings 17 and 18 in this position and the motion of the conveyor belt is coordinated in known manner with the rotation of the rings 17 and 18 so that the neck of a bird moves between the rings 17 and 18 just ahead of a poultry processing unit and so that the linear speed of the processing unit is greater than the linear speed of the bird as it passes between the rings 17 and 18. As a result, the linear speed of the rings 17 and 18 brings the neck of the bird immediately above its head into the throat 16 of the orienting means and the continuing rotation of the rings 17 and 18 causes the neck of the bird to pass through the throat 16 guided by the guide surfaces 11 and 12 and into the channel 15 between the guide surfaces 11 and 12.

As the rings 17 and 18 continue to rotate and the neck of the bird continues to move between the guide surfaces 11 and 12, the guide bars 13 and 14 start to move downward along the arc of the circle and away from the line of motion of the bird. This causes the guide surfaces 11 and 12 of the guide bars 13 and 14 to exert a downward pressure on the egg-shaped head of the chicken so as to position the bird with one side of its neck adjacent to the left guide bar 13 and the other side of its neck adjacent to the right guide bar 14. Thus, as the rings 17 and 18 continue to rotate and move the processing unit at a greater speed than the linear speed of the bird, the neck of the bird is brought in proper position into contact with the positioning portion 29 and then the cutting portion 30 of the blade 34 of the knife 10. The continued rotation of the rings 17 and 18 and motion of the bird causes the bird with only its jugular vein severed to pass on out of the channel 15 between the left guide bar 13 and the right guide bar 14 and to be carried by a conveyor belt to the next processing operation.

The number of processing units carried between the rings 17 and 18 is varied in accordance with the speed of the processing line, the size of the rings 17 and 18 and other obvious requirements of the processing operation. The embodiment of the invention described herein has four processing units. The rotation of the gear wheel 24 and of the rings 17 and 18 is accomplished by extending a continuous chain 35 within the right arm 21 into a housing 39 and between the gear wheel 24 and the drive sprocket 65 of a gear reducer 66. The gear reducer 66 is in turn driven by a belt 68 joining a pulley 67 of the gear reducer 66 and a pulley 69 of a motor 70. The housing 39 is generally box-like in shape and is integral and continuous with both the left arm 20 and right arm 21. The housing 39, the left arm 20 and the right arm 21 have covers 41, 42 and 43 and are mounted on a rectangular, horizontal frame 44 supported by a vertical leg 45 at each of its four corners. The lengths of the vertical leg 45 are selected to place the rings 17 and 18 in that general vertical position which will result in the neck of a bird carried in known manner along a processing line passing into a processing unit as already described. However, the exact vertical position required for the rings 17 and 18 varies with the size of the birds being processed at the particular moment on a poultry processing line. In order to adjust the vertical position of the rings 17 and 18 to the exact vertical position, required for each particular size of bird, the housing 39 and the arms 20 and 21 are pivotably mounted on the frame 44.

The housing 39 has a pair of tabs 46 and 47 extending from the end most remote from the arms 20 and 21 and a horizontal rod 48 is inserted through holes in these tabs 46 and 47 and holes in a pair of tabs 49 and 50 extending upward from the frame 44. This arrangement permits the housing 39, the arms 20 and 21 and the rings 17 and 18 to pivot upward away from the frame 44 about that end of the housing most remote from the rings 17 and 18. Thus, the vertical position of the rings 17 and 18 is adjusted by simply raising and lowering the extending ends of the arms 20 and 21. This is provided for by attaching an extension plate 51 to the extending end of the right arm 21 and an extension plate 52 to the extending end of the left arm 20, by horizontally positioning an axle 53 through ears 54 and 55 at that end of the frame 44 adjacent to the arms 20 and 21, by extending pivot bars 56 and 57 from the axle 53 toward each arm 20 and 21 and by joining each extension plate 51 and 52 to one of the pivot bars 56 and 57 with a link 58 and 59. When the axle 53 is rotated, the ends of the pivot bars 56 and 57 pivot upward or downward depending upon the rotational direction of the axle 53. This motion of the pivot bars 56 and 57 causes the links 58 and 59, the extension plates 51 and 52, and the arms 20 and 21 to also move upward or downward so as to vertically position the rings 17 and 18. The axle 53 is rotated by a lever 60 fixedly attached at one end and the rings 17 and 18 are maintained in a selected vertical position by extending a pin 61 through the lever into an arcuate standard 62 having a plurality of holes 63.

It will be obvious to those skilled in the art that many variations may be made in the embodiments here chosen for the purpose of illustrating the present invention without department from scope thereof as defined by the appended claims.

I claim:
1. A method of killing fowl comprising the steps of:
(a) moving the fowl in head-down position in a given direction of travel,
(b) engaging the neck of the fowl adjacent the head portion to stretch said neck into a taut position,
(c) orienting said head in a position so that the longer axis of the head is substantially parallel to the direction of travel, and
(d) engaging the neck of the fowl in the area of the jugular vein with a cutting means so as to sever the jugular vein of said fowl without severing the spinal cord and/or windpipe.

2. A method of killing fowl as claimed in claim 1 further characterized in that said cutting means moves in a substantially arcuate path.

3. A method of killing fowl as claimed in claim 2 and further characterized in that said cutting means moves substantially in the same direction as said fowl when engaging said neck.

4. A method of killing fowl as claimed in claim 1 and further characterized in that the orientation of the head of said fowl is performed substantially simultaneously with the stretching of the neck of said fowl into a taut position.

References Cited by the Examiner

UNITED STATES PATENTS

| | | | |
|---|---|---|---|
| 2,306,773 | 1/1942 | Biffinger | 17—11 |
| 2,512,089 | 6/1950 | Cervin | 17—11 |

SAMUEL KOREN, *Primary Examiner.*

LUCIE H. LAUDENSLAGER, *Examiner.*